United States Patent [19]
Flis et al.

[11] Patent Number: 5,914,060
[45] Date of Patent: Jun. 22, 1999

[54] METHOD OF LASER DRILLING AN AIRFOIL

[75] Inventors: Jeffrey D. Flis, Wallingford; James D. Jones, Naugatuck; James F. Waller, Jr., Portland, all of Conn.

[73] Assignee: United Technologies Corporation, Hartford, Conn.

[21] Appl. No.: 09/162,832

[22] Filed: Sep. 29, 1998

[51] Int. Cl.⁶ .................................................. D23K 26/18
[52] U.S. Cl. .................................. 219/121.71; 29/889.721
[58] Field of Search ........................... 219/121.7, 121.71, 219/121.85; 29/889.721; 264/102; 95/241, 266

[56] References Cited

U.S. PATENT DOCUMENTS

| | | | |
|---|---|---|---|
| 4,873,414 | 10/1989 | Ma et al. | 219/121.7 |
| 5,011,626 | 4/1991 | Ma et al. | 219/121.7 X |
| 5,049,722 | 9/1991 | Corfe et al. | 219/121.71 |
| 5,140,127 | 8/1992 | Stroud et al. | 219/121.71 |
| 5,222,617 | 6/1993 | Gregory et al. | 219/121.71 |
| 5,368,634 | 11/1994 | Hackett | 95/266 X |
| 5,687,465 | 11/1997 | Hinata et al. | 264/102 X |
| 5,767,482 | 6/1998 | Turner | 219/121.71 |
| 5,773,790 | 6/1998 | Moore et al. | 219/121.71 |
| 5,776,222 | 7/1998 | Kopylov et al. | 65/384 |

FOREIGN PATENT DOCUMENTS

| | | | |
|---|---|---|---|
| 4-41090 | 2/1992 | Japan | 219/121.7 |
| 4-172194 | 6/1992 | Japan | 219/121.71 |
| 7-279611 | 10/1995 | Japan . | |
| 2241186 | 8/1991 | United Kingdom | 219/121.71 |

*Primary Examiner*—Gregory Mills
*Attorney, Agent, or Firm*—Gene D. Fleischhauer

[57] ABSTRACT

A method for laser drilling cooling air holes 42 into a leading edge passage 38 of an airfoil is disclosed. Various details of the method are developed for forcing material which blocks the laser beam into the leading edge passage. In one embodiment, the blocking material is forced into the leading edge passage 38 by expanding gas bubbles in a supply passage 54 for the blocking material.

23 Claims, 2 Drawing Sheets

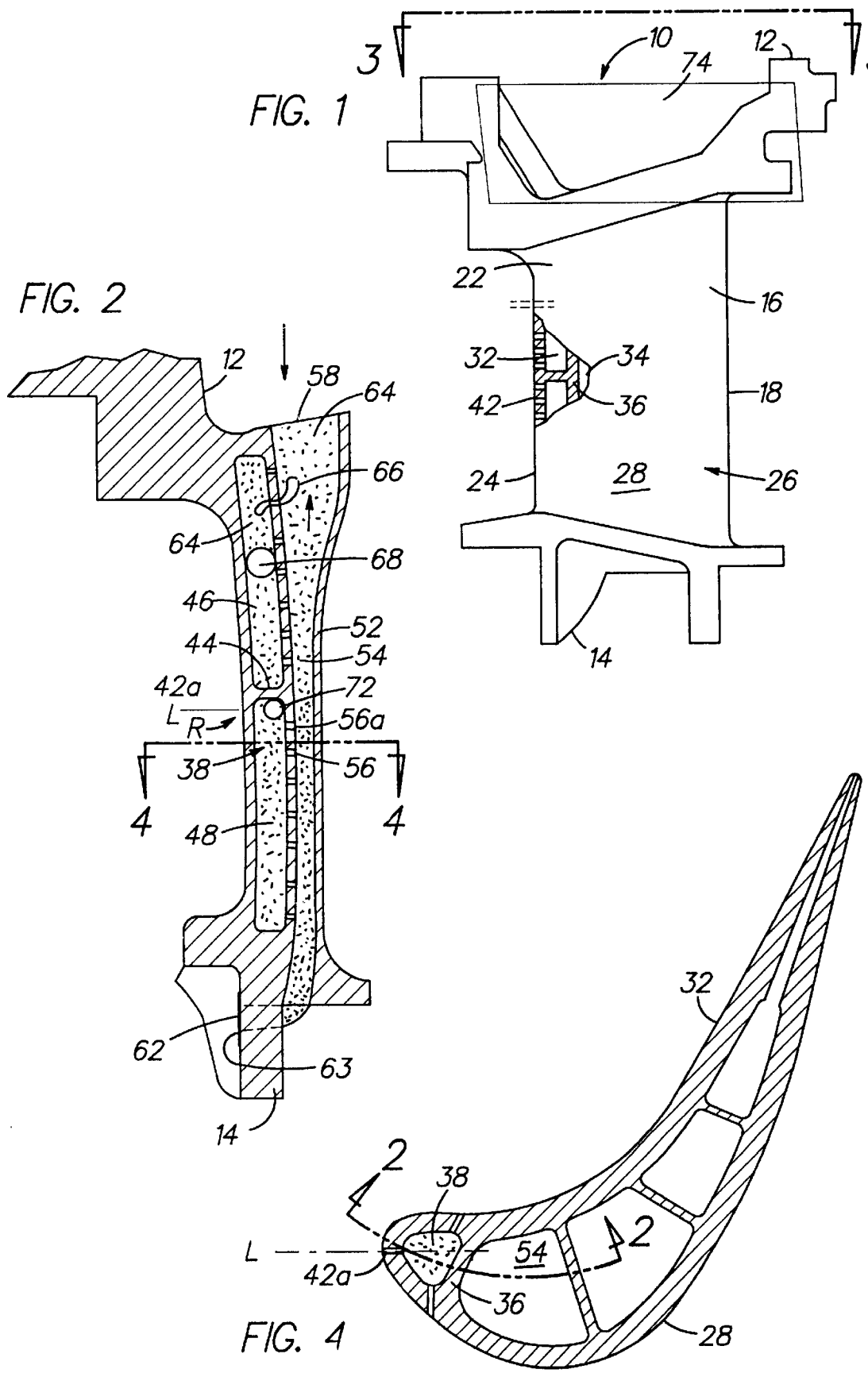

METHOD OF LASER DRILLING AN AIRFOIL

TECHNICAL FIELD

This invention relates to a method for laser drilling an airfoil which includes disposing material in passages of the airfoil for blocking a laser beam from striking the interior once the cooling air hole is drilled through the wall of the airfoil. More particularly, this invention relates to a method for disposing material in passages in the airfoil, such as a leading edge passage through an adjacent passage which is in flow communication with the leading edge passage.

BACKGROUND OF THE INVENTION

Airfoils for gas turbine engines are disposed in a flowpath for working medium gases. Examples of such airfoils are turbine blades and turbine vanes. The airfoils are bathed in hot gases as the gases are flowed through the engine. Cooling air is flowed though passages on the interior of the airfoil under operative conditions to keep the temperature of the airfoil, such as a turbine vane or turbine blade, within acceptable limits.

In addition, the airfoil may have cooling air holes extending from the interior to the exterior of the airfoil. The cooling air holes duct cooling air from passages on the interior of the airfoil through the hot walls to the exterior. The exhausted cooling air provides transpiration cooling as the air passes through the wall and film cooling with a film of cooling air on the exterior as the air is discharged from the airfoil. The film of cooling air provides a barrier between the airfoil and the hot, working medium gasses.

The cooling air holes are small and may have diameters that are in a range of eleven to seventeen mils (0.011–0.017 inches). The holes are drilled in predetermined patterns and are contoured to insure adequate cooling of the airfoil.

One way to drill the holes uses a laser to direct a beam of coherent energy at the exterior of the airfoil. The intense radiation from the laser beam burns through the wall of the airfoil, leaving behind a hole which provides a satisfactory conduit for cooling air. As the laser beam penetrates through the airfoil wall into an interior cavity, the laser beam may strike adjacent structure on the other side of the cavity causing unacceptable damage to the airfoil. Accordingly, blocking material may be disposed in the cavity to block the laser beam from striking walls bounding the cavity after the beam penetrates through the airfoil wall.

One approach is to leave disposed within the airfoil the ceramic casting core around which the blade is poured during the manufacturing process. The ceramic core provides a suitable blocking material. The ceramic core is subsequently removed by well known leaching techniques. This approach is described in U.S. Pat. No. 5,222,617 entitled "Drilling Turbine Blades" issued to Gregore, Griffith and Stroud. However, the presence of the core after casting prevents initial inspection of the interior of the airfoil. The ceramic material may also be difficult to remove once the cooling air holes are drilled. In addition, the core is not available during repair processes for the airfoil which may require redrilling of the cooling air holes.

Another example of a blocking material is wax or a wax-like material. The material is melted so that it may easily flow into interior passages, such as the leading edge passage of the airfoil. The temperature of the molten material above its melting point, may exceed two hundred and fifty degrees Fahrenheit (250°). The molten material may be poured or injected into the cavity or may even be sprayed or painted on the surface to be protected. However, the molten material may severely scald personnel working with the material. In addition, the wax may extend between two closely adjacent cooling air holes. The wax adjacent the first hole, which blocks the laser beam as the second hole is drilled, may melt as the first hole is drilled by the laser beam. This causes a void to form in the wax. As a result, the energy from the laser beam at the second hole may not be sufficiently dissipated by the wax as it passes through the portion of the passage having the void. Damage may occur to the airfoil as the second hole is drilled because the beam, after it penetrates through the wall at the second hole, may strike the interior wall of the airfoil.

One wax-like blocking material which uses an additive to avoid forming voids is discussed in U.S. Pat. No. 5,049,722, issued to Corfe and Stroud, entitled "Laser Barrier Material And Method Of Laser Drilling." In Corfe, a PTFE (polytetrafluoroethylene) wax-like material is disposed in a wax base. The PTFE helps avoid the formation of voids. Disposing such material on the interior of a leading edge passage is particularly difficult for some airfoils. Often the leading edge passage has no connection during fabrication with the exterior of the airfoil. It is a blind or dead end passage prior to the drilling operation except for small impingement holes which place the passage in gas communication with an adjacent passage. The adjacent passage also has an opening for receiving cooling air which is flowed to the leading edge passage. Accordingly, personnel must carefully pour the molten material in the inlet opening and manipulate the airfoil to avoid bubbles in the material in the leading edge passage.

Still another approach is to use a masking agent, such as an epoxy resin, which is disposed in the airfoil in a fluid state. The epoxy resin is disposed in the airfoil by simply pouring the resin into the airfoil. The epoxy resin is at room temperature and poses no scalding hazard to personnel. The epoxy resin is further processed to harden the fluid and cause it to become a more solid material similar to the PTFE wax mentioned in U.S. Pat. No. 5,049,722. However, the resin is relatively viscous compared to molten wax and has difficulty in flowing through small connecting passages on the interior of the airfoil.

As a result, air bubbles tend to form in blocking material in blind cavities, such as the leading edge passage, and in passages which are blocked by the in flowing viscous material. These air bubbles result from not flowing enough epoxy resin into the leading edge region to eliminate the voids. In addition, the structural design of the airfoil may cause the airfoil to trap an air bubble with structure within the leading edge passage.

Accordingly, scientists and engineers working under the direction of Applicants' Assignee have sought to develop a method for disposing fluid blocking material in a structure having a shaped cavity such as the leading edge of an airfoil such that the fluid material is forced into the leading edge cavity as the blocking material is flowed into the airfoil.

SUMMARY OF INVENTION

According to the present invention, a method for disposing blocking material through a plurality of impingement holes in a leading edge passage of an airfoil prior to drilling cooling air holes to the passage includes 1) flowing blocking material into an adjacent passage and into the leading edge passage that traps gas in the passages and 2) displacing the blocking material by placing the airfoil in a partial vacuum which increases the volume of the gas escaping through the passages to force blocking material from the second passage into the leading edge region through the impingement holes.

In accordance with the present invention, the method includes flowing a fluid blocking material formed of a mixture of epoxy resin and a curing agent at room temperature into the airfoil in an environment that is at room temperature.

In accordance with one detailed embodiment of the present method, enough fluid mixture is mixed for the airfoils such that the time of filling the airfoils is approximately equal to the amount of time that the filled airfoils spend at a reduced pressure to limit the length of time the epoxy resin and curing agent are interacting prior to disposing the mixture in a reduced atmosphere environment.

In accordance with one detailed embodiment of the invention, the blocking material hardens in an environment having a pressure which is greater than the pressure of the partial vacuum to decrease the volume of any trapped gas in the blocking material disposed within the airfoil.

A primary feature of the present invention is the step of forming gas bubbles having increased volume through use of a partial vacuum, with the expanded bubbles forcing blocking material in fluid form through impingement holes that connect a second passage to the leading edge passage of the airfoil. Another feature of the present invention is the pressure at which the hardening step is carried out which compresses the volume of any pockets of gas molecules remaining in the blocking material. Still another feature of one embodiment of the present invention is the level of temperature of the blocking material flowed into the airfoil. Another feature of the present invention is the step of removing the blocking material by heating the blocking material to an elevated temperature to vaporize the blocking material.

A principal advantage of the present invention is the speed at which airfoils may be filled with a blocking material which results from forcing the blocking material into the leading edge region of the airfoil through small impingement holes. Another advantage is the cost of performing the drilling function which results from the ease of handling the airfoils filled with blocking material and avoiding scraped parts or parts needing rework which results from forcing enough blocking material at room temperature into the leading edge region. Another principal advantage of the present invention is the health and safety of personnel using the method by avoiding the possibility of scalding of personnel handling blocking material and airfoils filled with blocking material which results from using a fluid epoxy resin and hardener at room temperature for the blocking material during the filling operation. Still another advantage of the present invention is the ease of removing the blocking material after completion of the drilling operation by heating the filled airfoil after drilling to a temperature which vaporizes the blocking material.

BRIEF DESCRIPTION OF DRAWINGS

FIG. 1 is a side elevation view of a turbine airfoil of the turbine vane type with part of the flow directing portion of the airfoil broken away and sectioned to show the interior of the airfoil.

FIG. 2 is a cross sectional view of the partially formed stator vane shown in FIG. 1 partially broken away to show the interior of the airfoil and, in schematic fashion, the presence of gas bubbles disposed in a blocking material.

FIG. 4 is a cross sectional view taken along the lines 3—3 of FIG. 3 with portions of the airfoil broken away below for clarity.

DETAILED DESCRIPTION OF THE INVENTION

Figure 3:
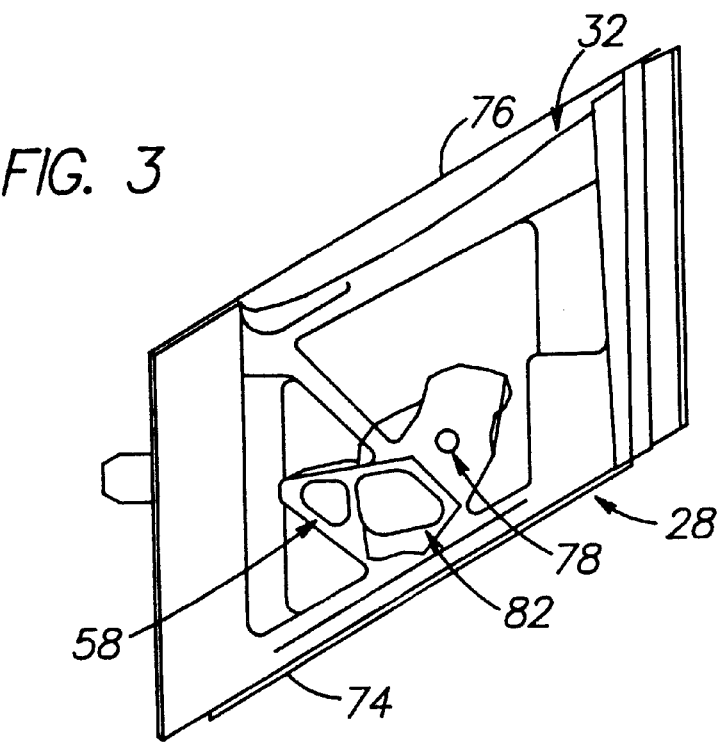
FIG. 3 is a view taken along the lines 2—2 of FIG. 1.

FIG. 1 is a side elevation view of an airfoil for a gas turbine engine as represented by stator vane 10 for such an engine. The term airfoil includes without limitation turbine blades and turbine vanes and refers to all portions of the turbine blade and the stator vane including their flow directing surfaces, platforms and buttresses.

The airfoil has an outer end 12 and an inner end 14. The airfoil has a trailing edge region 16 having a trailing edge 18 which extends in the spanwise direction. A leading edge region 22 is spaced chordwisely forward of the trailing edge region. The leading edge region has a leading edge 24 which extends in the spanwise direction.

The airfoil 10 further has a flow-directing surface 26 which extends between the inner end 14 and the outer end 12. The flow-directing surface includes a suction sidewall 28 and a pressure sidewall 32. The suction sidewall and pressure sidewall are joined at the leading edge 24 and the trailing edge 18 leaving a cavity 34 for cooling air disposed therebetween.

The airfoil 10 has a first internal wall 36 disposed in the cavity 34. The first wall 36 is spaced chordwise from the leading edge 24. The first wall extends between the suction sidewall 28 and the pressure sidewall 32 leaving a first passage 38 for cooling air therebetween. The first passage extends spanwise in the leading edge region 22. During the process of fabrication, cooling air holes 42 are drilled by appropriate means. The cooling air holes extend through the sidewalls to the interior of the airfoil in the leading edge region and in other regions of the airfoil (not shown). The first passage is not in flow communication with the exterior of the airfoil through the leading edge region in a partially formed airfoil.

FIG. 2 is a cross-sectional view of a portion of a partially formed airfoil 10 corresponding to the finished airfoil 10 shown in FIG. 1. A part of the partially formed airfoil is broken away to show the leading edge region of the airfoil. As shown in FIG. 2, the airfoil does not yet have cooling air holes 42 drilled in the leading edge region. The airfoil has a second internal wall 44 extending chordwise to divide the first spanwise passage 38 into a first spanwise region 46 and a second spanwise region 48.

The airfoil 10 has a third internal wall 52 spaced chordwise from the leading edge 24 and from the first wall 36. The third internal wall extends between the sidewalls 28, 32 leaving a second passage 54 extending spanwise adjacent to the first passage 38. A plurality of impingement holes 56 extend through the first wall to place the first passage in flow communication with the second passage. A first opening 58 at the outer end 12 and a second opening 62 at the inner end 14 of the airfoil place the second passage in flow communication with the exterior of the airfoil. A cover 63 extends over the second opening to seal the opening during manufacture.

A blocking material 64 in the fluid state is shown disposed in the leading edge region 22. Bubbles of gas are trapped during filling of the airfoil with blocking material. The bubbles are shown in schematic fashion as represented by the gas bubble 66, the gas bubble 68 and the gas bubble 72. The first passage 38 is always in fluid communication and generally in gas communication with the second passage 54 through the impingement holes 56 depending on the orientation of the airfoil. As a result, the first passage and the second passage generally have flow communication with the exterior of the airfoil through the first opening 58 at the outer end 12 and the second opening 62 at the inner end 14. However, regions of reduced circulation form for the gas as blocking material in fluid form is flowed during filling into the second passage and into the first passage from the second passage. For example, the location of impingement hole 56a is closest to the second wall, and is spaced spanwise from the second wall. The fluid blocking material might fill to this level leaving a region of restricted circulation R for gas above the hole. The impingement hole places a portion of the second region that is closest to the region R in gas communication with the second passage but does not extend to the region R.

FIG. 3 is a view from above of the first outer end 12 of the airfoil 10 taken along the lines 3—3 of FIG. 1. FIG. 1 and FIG. 3 show the relationship to the outer end 12 of a first dam 74 (shown in phantom on FIG. 1 and in full on FIG. 3) on the suction side of the airfoil. As shown in FIG. 3, a second dam 76 on the pressure side of the airfoil faces the first dam. A cover or a barrier 84 extends over certain other openings 78, 82 in the airfoil to block the flow of fluid blocking material to these locations. The dams and the barriers cooperate with the first side of the airfoil to form a bowl 86 to receive and funnel the fluid toward the first opening.

FIG. 4 is a cross sectional view through the airfoil shown in FIG. 2 along the lines 4—4. The method of drilling a cooling hole 42 at the leading edge 24 of the airfoil employs a laser beam of focused coherent light. The laser beam impacts the exterior of the airfoil.

FIG. 4 shows the relationship of a laser beam to the exterior of the airfoil and to the first passage 38 during the process of drilling the cooling air hole 42. The laser beam is schematically represented by the center line L. As the laser beam reaches the interior of the airfoil, the laser beam burns through the wall forming a breakout hole on the interior of the wall. The line of strike of the laser beam is coincident with the center line L. The line of the laser beam is shown extending across the first passage 38 to strike the first wall 36 as if blocking material were not present. Alternatively, the laser beam may strike the exterior wall of the airfoil or, depending on the orientation of the cooling air hole, the first internal wall in the leading edge region. Unless blocking material absorbs and dissipates the energy of the beam. Holes may be drilled or partially drilled into the first wall or into the exterior wall in this region. These holes may result in scrapping of the airfoil or costly rework of the airfoil.

Accordingly, the method of drilling the cooling air hole 42 requires disposing a blocking material in regions of the airfoil adjacent the location of cooling air holes in the leading edge region. This includes orienting the airfoil 10 with respect to a source of blocking material such that the blocking material may be flowed into the second passage 54 of the airfoil and thence into the first passage 38 of the airfoil. Typically, the airfoil is disposed in a fixture for holding the airfoil that tilts the inner end of the airfoil rearwardly about five degrees (5°) from the vertical.

In the partially formed condition of the airfoil 10 shown in FIG. 2, the first passage 38 in the leading edge region 22 is a blind cavity having no exit holes (cooling air holes 42) in the leading edge region. Instead, the impingement holes 56 extending between the first passage and the second passage 54 must provide both an inlet for the blocking material 64 and an exit for trapped gases on the interior of the airfoil.

The step of flowing blocking material 64 into the second passage 54 and thence into the first passage 38 typically takes place in a first environment. The term "environment" (such as first environment, second environment, and third environment) is used to refer to the gas which surrounds the exterior of the airfoil during at least a portion of a step and to the pressure and temperature of that gas. The term "gas" includes a gas made up of molecules of a single type of atom, such as argon, or many types of atoms, such as air.

In one embodiment of the present invention, the gas in the first environment is air at a first pressure P1 and a first temperature T1. The first pressure P1 is atmospheric pressure, approximately fourteen and seven-tenths pounds per square inch absolute (14.7 psia) and the first temperature is approximately equal to room temperature. Room temperature typically lies in a range of about seventy (70) degrees Fahrenheit to eighty (80) degrees Fahrenheit.

One material which was found acceptable for blocking material is a curable fluid epoxy resin and fluid curing agent. The mixture is cured prior to the drilling operation. Shell Chemical Company, P.O. Box 4320, Houston, Tex., offers this resin as EPON Resin 815 resin. The curing agent is EPI-CURE Curing Agent 3140 material. Equal volume parts of the resin and the curing agent are mixed together. The curing agent is a low viscosity curative, applicable typically to adhesive flooring and general coatings. At temperatures of about eighty (80) degrees Fahrenheit (twenty-five (25) degrees centigrade), the viscosity of the curing agent is about three thousand to six thousand (3,000–6,000) centipoise and the viscosity of the resin is about five hundred to seven hundred (500–700) centipoise. The mixture of the resin and curing agent at room temperature has a viscosity that approximates that of molasses, and may lie in a range of about seventeen hundred and fifty (1750) centipoise to about thirty-four hundred (3400) centipoise.

Prior to pouring the molasses-like mixture of epoxy resin and curing agent into the first passage, the method includes forming the dams 74, 76 and installing covers at selected locations of the airfoil. For example, the method includes forming the bowl 86 at the outer end of the vane. The bowl is adjacent the first opening 58 of the vane and is formed by applying aluminum tape to the sides of the airfoil. The tape forms a dam 74 on the suction side and dam 76 on the pressure side of the end of the vane. One satisfactory aluminum tape is available as Aluminum Foil Glass Cloth Tape, Part Number 2925-7, from Furon Inc., 14 McCaffrey Street, Hoosick Falls, N.Y. 12090. The height H1 of the tape is about three-eighths (⅜) of an inch above the portion of the airfoil which is adjacent to the first opening. The airfoil has other openings 78, 82 at the outer end of the vane. The method includes blocking these other openings if necessary. The same aluminum tape is used for the cover 63 at the second opening 62. The opening is covered prior to flowing blocking material into the second passage 54.

Blocking material is poured into the bowl formed by the dams and into the second passage until the blocking material reaches a height H2 above the opening. The height H2 is less than the height H1 of the dam and typically is about one-fourth (¼) of an inch.

As the blocking material flows into the second passage 54 and into the first passage 38, the blocking material traps gas, such as the air of the first environment, in pockets in the second passage. Alternatively, the aluminum tape might be applied to provide a barrier at the second opening after the blocking material was flowed into the second passage. This would ensure that as much air as possible was driven out of the second passage but is time consuming because the airfoil must be manipulated and cleaned of any resin that reaches the exterior of the airfoil. This would occur prior to substantial amounts of the blocking material flowing into the first passage.

Enough fluid blocking material is mixed so that it is all substantially consumed in filling the next batch of airfoils going into the vacuum oven. Thus, the amount of time filling a batch of the airfoils is about equal to the time spent in the partial vacuum by the previous batch of filled airfoils.

The airfoil filled with blocking material is disposed in a vacuum oven having a second environment of air at a second temperature T2 and a second pressure P2 to form a partial vacuum for a period of about twenty (20) to thirty (30) minutes. The second pressure P2 is less than the first pressure P1 (typically, atmospheric pressure) of the first environment. The second pressure is typically less than one hundred and twenty-five (125) Torr that is, less than about two and one half (2.5 psia). The temperature T2 of the atmosphere at the partial vacuum is about room temperature. The temperature T2 in alternate embodiments of the invention might increase above the temperature T1 as long as hardening of the blocking material is not increased by an amount that would capture air bubbles in the leading edge region as the air is evacuated from the blocking material into the second environment. A temperature T2 higher than the temperature T1 might be advantageous in situations where the viscosity of the blocking material decreases with temperature.

The method includes orienting the airfoil such that buoyant forces act on the bubbles of gas trapped in the blocking material. In the embodiment shown, the vane is a free standing structure supported by its inner end and may be placed in the vacuum oven without further support. Alternatively, the vane is disposed in a fixture which cants the second end of the vane rearwardly about five (5) degrees. Once such fixture has a pair of parallel rods which each engage the underside of the outer end of the vane platform. This avoids the need for special fixturing, speeding handling of the vanes and reducing handling costs.

The partial vacuum causes the air bubble 68 to expand, increasing the buoyant forces acting on the bubble. An expanded bubble in the first passage 38 is urged by buoyant forces from the first passage into the second passage 54. This expanded bubble joins other expanded bubbles disposed in the second passage. As the expanded bubbles, such as the bubble 73, flow upwardly in the second passage, the bubbles urge the blocking material to flow into the first passage through the impingement holes 56 extending between the second passage and the first passage. Blocking material urged into the first passage in turn helps force air from the first passage through the impingement holes into the second passage increasing the effect of the bubbles passing through the second passage and urging more blocking medium into the first passage.

After disposing the airfoil filled with blocking material in the partial vacuum of the second environment, the airfoil filled with blocking material is disposed in a third environment. The third environment has a gas at a third pressure P3 which is greater than the second pressure P2. The gas is typically air at a temperature T3 which is greater than the temperature T2. For example, the temperature used with this particular mixture of epoxy resin and curing agent (EPON Resin 815 resin and EPI-CURE Curing Agent 3140 material) is in a range of about two hundred and twenty-five (225) degrees Fahrenheit to two hundred and seventy-five (275) degrees Fahrenheit. Typically the environment is at a temperature of about two hundred and fifty (250) degrees Fahrenheit. The mixture of epoxy resin and curing agent is held in this temperature range for about twenty (20) minutes to thirty (30) minutes causing the mixture to harden. This is followed by a curing time in a fourth environment of about forty-eight hours at room temperature and atmospheric pressure to finally cure the mixture of epoxy resin and curing agent. An alternate embodiment of the present invention might use another material such as wax. In such a case, the step of flowing the blocking material into the second passage in a first environment might be carried out at a higher temperature. Another approach would use wax in the molten state at such an elevated temperature that the heat in the wax keeps the wax molten as it is flowed into the vane. The step of disposing the filled airfoil in a second environment would be carried out in a vacuum oven in a partial vacuum at an elevated temperature to keep the wax molten. The step of disposing the airfoil filled with wax in the third environment for curing would take place at a temperature T3 lower than the temperature T2 and at a pressure P3 which is higher than the pressure P2 to solidify the wax.

Figure 5:
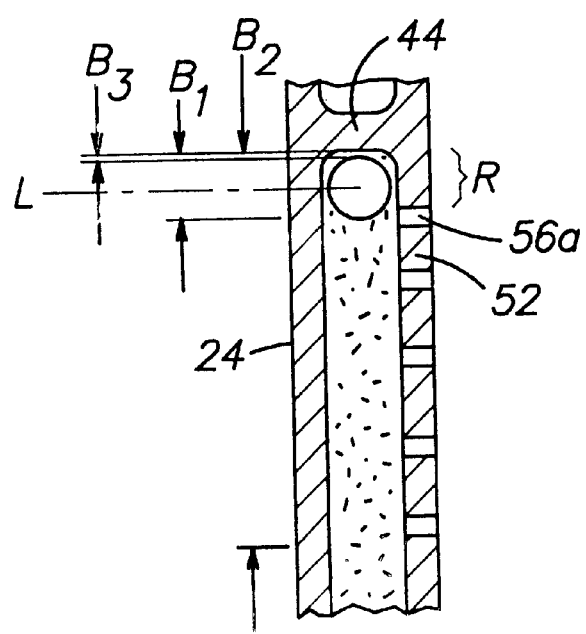
FIG. 5 is an enlarged view of a portion of FIG. 2.

A particular advantage of the present method occurs in filling articles with blocking material that have regions of reduced circulation such as the region R shown in FIG. 2 and shown in an enlarged view in FIG. 5. Although the phenomena is not well understood, empirical data suggests that the following occurs in this region. It is possible for the region R to trap a bubble of gas which is coextensive in spanwise height with the height B of the region R. Disposing the airfoil filled with blocking material in the second environment at a pressure which is less than approximately one hundred and twenty-five (125) Torr, decreases the external pressure of the gas in the environment on the blocking material. This, in turn, decreases the pressure on the trapped gas in the bubble.

The ideal-gas law provides a good approximation of the effect of pressure of the environment and temperature of the blocking material on the volume of the trapped bubble.

The ideal-gas law states that pV=nRT where V=volume of n moles of gas; p=absolute pressure; T=absolute temperature; and R=a universal constant whose value depends only on the units used. Gases at a pressure of a few atmosphere may usually be considered ideal for engineering calculations. The ideal-gas law suggests that decreasing the external pressure by a factor of six (from seven hundred and sixty (760) Torr to less than one hundred and twenty-five (125) Torr) will result in a sixfold increase in volume of the trapped gas. In the absence of the array of impingement holes 56, the bubble would expand spanwisely to a spanwise height $B_2$ in the second portion of the passage. The new spanwise height $B_2$ with the partial vacuum would be about six (6) times greater than the spanwise height $B_1$.

Impingement holes are not absent from the airfoil. In fact, there are impingement cooling air holes which place the first passage in flow communication with the exterior of the airfoil. Decreasing the pressure to pressure $P_2$ allows the trapped gas to expand to the impingement hole 56a which is closest to the second wall 44 and which is adjacent to the region R. The buoyant forces acting on the trapped bubble 72 push the bubble out through the impingement hole 56a and into the second passage and thence to the exterior of the airfoil. This continues until the gas bubble no longer extends out of the region R. Thus at the reduced pressure $P_2$, the trapped gas bubble still extends for the same spanwise height $B_1$ but many molecules of air have escaped.

Disposing the airfoil filled with a blocking material in the third environment at the third pressure P3 causes the volume of the gas to decrease to a spanwise height $B_3$ and to less than a sixth of its original volume. Thus, the trapped gas still displaces a small portion of the blocking material and forms a void of height $B_3$. However, the shrunken void is not aligned with the drilling axis L of the laser beam for the cooling air hole 42a which extends through the leading edge of the airfoil between the impingement hole and the second wall 44. Heating the blocking material during the hardening step does cause the volume of the gas to increase above the temperature T2. The volume increase is small (approximately a two to threefold increase in volume depending on the temperature of the gas in the bubble) compared to the decrease in volume that results from decreasing the pressure to a sixth (⅙) of its normal value during the process of removing the trapped gas. As a result, the laser beam L does not intercept the void formed by the bubble and the laser beam does not strike the wall.

This method may also be applied to any blocking material which is fluid in form and hardened. For example, a blocking material which has a wax base is evacuated in the second environment at an elevated temperature to keep the wax in fluid form and then cooled to room temperature to harden the wax. For such a blocking material, both the pressure and temperature of the second and third environments act to reduce the volume of the trapped gas during the evacuation and hardening process.

The hardening process is completed by curing the resin mixture at room temperature and atmosphere pressure for forty-eight (48) hours in a fourth environment. Once the hardening process is complete, the blocking material maintains its shape by reason of its increased resistance to differences in ambient pressure. The epoxy resin is particularly resistant to any effect of pressure but it is believed that wax-like material would work equally well.

The method includes the step of drilling cooling air holes through the external wall of the airfoil into the leading edge cavity and at such other locations as may be required. This step is carried out using conventional laser drilling techniques.

Thereafter, the interior of the airfoil is cleaned of the blocking material by placing the airfoil in a fifth environment having air, such as an oven, and heating the environment to a temperature of thirteen hundred (1,300) degrees Fahrenheit. The epoxy resin is vaporized leaving at most some fine particles which may pass through the cooling air holes. This is followed by performing a water flow test on the airfoil to ensure that the cooling air holes are of acceptable size. The water flow test flows water through the airfoil and would carry any oxidized particles of resin away if any such particles exist.

An advantage of the present invention is the reduced cost of fabricating the airfoil which results from using a blocking material which does not require extensive manipulation of the airfoil in many directions to remove trapped gas bubbles with buoyant forces. Another advantage in one embodiment is the reduced level of risk of scalding personnel handling the airfoil during the filling operation which results from using an epoxy resin and curing agent at room temperature. Another advantage is the level of cost for the process which results from avoiding costs associated with scrapped airfoils or the costs associated with reworking airfoils which may be damaged during the drilling operation but which are reworked to bring them into acceptable configuration. Still another advantage is the removal of the blocking material by heating the airfoil to an elevated temperature which vaporizes most, if not all, of the blocking material. Any fine particles of powder left behind are easily washed away during further processing of the airfoil.

Although this invention has been shown and described with respect to the detail embodiments thereof, it will be understood by those skilled in the art that various changes in the form and detail thereof may be made without departing from the spirit and scope of the claimed invention.

What is claimed is:

1. A method of drilling a cooling hole into the interior of an airfoil by means of a laser, the airfoil including an outer end, an inner end, a trailing edge region having a trailing edge, a leading edge region having a leading edge, the airfoil further including a suction sidewall and a pressure sidewall which are joined at the leading and the trailing edge leaving a cavity for cooling gas disposed therein, the airfoil further including a first wall spaced chordwise from the leading edge and extending between the sidewalls leaving a first passage extending spanwisely in the leading edge region which is not in flow communication with the exterior of the airfoil through the leading edge region prior to disposing blocking material in the leading edge region, the airfoil including a second internal wall, and having a third internal wall spaced chordwise from the leading edge and extending between the sidewalls leaving a second passage extending spanwisely adjacent to the first passage which is in flow communication with the first passage through a plurality of impingement holes in the first wall, the first passage being in flow communication with the second passage through the impingement holes as blocking material is flowed into the airfoil, the second passage and thus the first passage being in flow communication with the exterior of the airfoil through a first opening at the outer end, comprising:

orienting the airfoil with respect to a source of blocking material such that blocking material may be flowed into the second passage;

flowing blocking material into the second passage in a first environment having a gas at a first pressure $P_1$ and a first temperature $T_1$ and thence into the first passage, the blocking material being disposed in at least one of said passages such that it traps gas in the passage;

disposing the airfoil filled with the blocking material in a second environment having a gas at a partial vacuum at a second temperature $T_2$ and a second pressure $P_2$ which is less than about one-hundred and twenty-five Torr and which is less than the first pressure $P_1$ which includes orienting the airfoil in a first position such that buoyant forces acting on at least one expanding gas bubble urge the expanding gas bubble in the first passage into the second passage and urge the gas bubble in the second passage toward the first opening;

disposing thereafter the airfoil filled with blocking material in a third environment having a gas at a third pressure $P_3$ which is greater than the second pressure $P_2$;

heating the airfoil filled with blocking material at the third pressure $P_3$ for a predetermined period of time to harden the blocking material;

drilling a hole through the leading edge region by impacting the surface of the airfoil in the leading edge region with energy from a laser beam;

wherein expanding bubbles passing through the second passage urge the blocking material to flow into the first passage through the impingement holes extending between the second passage and the first passage; wherein blocking material urged into the first passage forces gas from the first passage through the impingement holes into the second passage; and, wherein the higher pressure $P_3$ acting on the blocking material compresses any bubbles remaining to reduce the size of voids in the hardened blocking material; and, wherein the blocking material absorbs energy from the laser beam at the drilling location and blocks the beam from damaging the interior of the airfoil.

2. The method of drilling a cooling hole into the interior of an airfoil of claim 1 wherein the gas in the first, second and third environments is air.

3. The method of drilling a cooling hole into the interior of an airfoil of claim 2 wherein the pressure $P_2$ is a partial vacuum.

4. The method of drilling a cooling hole into the interior of an airfoil of claim 3 wherein the pressure $P_2$ is a partial vacuum at a pressure less than about one-hundred and twenty-five Torr.

5. The method of drilling a cooling hole into the interior of an airfoil of claim 1 wherein the pressure $P_2$ is a partial vacuum.

6. The method of drilling a cooling hole into the interior of an airfoil of claim 5 wherein the pressure $P_2$ is a partial vacuum at a pressure less than about one-hundred and twenty-five Torr.

7. The method of drilling a cooling hole into the interior of an airfoil of claim 1 wherein the second temperature $T_2$ of the gas in the second environment is at a temperature which is greater than the temperature $T_1$.

8. The method of drilling a cooling hole into the interior of an airfoil of claim 7 wherein the the blocking material is a wax based material having a melting point above the first temperature $T_1$ and is flowed in molten form into the structure.

9. The method of drilling a cooling hole into the interior of an airfoil of claim 1 wherein the second temperature $T_2$ of the gas in the second environment is at a temperature which is approximately the same as the temperature $T_1$.

10. The method of drilling a cooling hole into the interior of an airfoil of claim 9 wherein the second temperature $T_2$ of the gas in the second environment and the temperature $T_1$ of the gas in the first environment are each about room temperature.

11. The method of drilling a cooling hole into the interior of an airfoil of claim 10 wherein the the blocking material is an epoxy resin material which is mixed at room temperature and thereafter flowed into the airfoil without further heating.

12. The method of drilling a cooling hole into the interior of an airfoil of of claim 1 wherein the third pressure $P_3$ of the gas in the third environment is at a pressure which is approximately the same as the pressure $P_1$ of the first environment.

13. The method of drilling a cooling hole into the interior of an airfoil of claim 12 wherein the third pressure $P_3$ of the gas in the third environment and the pressure $P_1$ of the gas of the first environment are ambient pressure.

14. The method of drilling a cooling hole into the interior of an airfoil of claim 1 wherein the third temperature $T_3$ of the gas of the third environment is at a temperature which is greater than the temperature $T_2$ and provides a hardening temperature for the blocking material.

15. The method of drilling a cooling hole into the interior of an airfoil of claim 14 wherein the material is an epoxy resin and the temperature is the setting temperature for the resin of about two-hundred and fifty (250) degrees Fahrenheit.

16. The method of drilling a cooling hole into the interior of an airfoil of claim 1 wherein the material is flowed in molten form into the strucure and wherein the third temperature $T_3$ of the gas of the third environment is at a temperature which is less than the melting temperature of the material to solidify the material.

17. The method of drilling a cooling hole into the interior of an airfoil of claim 1 wherein the second wall extends chordwise to divide the first spanwise passage into a first spanwise region and a second spanwise region, and wherein one of the impingement holes in flow communication with the second region is the impingement hole closest to the second wall leaving a region R of restricted circulation above the hole when the airfoil is oriented to receive the blocking material; and, wherein remaining voids in the blocking material resulting from trapped gas in the region of reduced circulation in the first passage not responding to buoyant forces at the filling pressure $P_1$ are reduced by first expanding the volume of gas in the region against the pressure $P_2$ until the expanded bubble of gas from the region is in flow communication with the impingement hole adjacent to the chordwise second wall causing at least a portion of the gas bubble to escape from the region R of the first passage through the second passage.

18. The method of drilling a cooling hole into the interior of an airfoil of claim 1 wherein the method of flowing blocking material into the second passage includes forming a dam about one end of the airfoil about the opening in the airfoil which extends for a height $H_1$ above the portion of the airfoil adjacent to the first opening and filling the dam to a second height $H_2$ above the opening which is less than $H_1$.

19. The method of drilling a cooling hole into the interior of an airfoil of claim 18 wherein the opening is a first opening and the aifoil has a second opening at the second end in flow communication with the second passage and wherein the method of flowing blocking material into the second passage includes blocking the second opening at the second end of the airfoil.

20. The method of drilling a cooling hole into the interior of an airfoil of claim 19 wherein the second opening is blocked prior to flowing the blocking material into the first passage but after a portion of the blocking material is flowed into the second passage.

21. The method of drilling a cooling hole into the interior of an airfoil of claim 19 wherein the second opening is blocked prior to flowing the blocking material into the second passage.

22. A method of drilling a cooling hole into the interior of an airfoil by means of a laser, the airfoil including an outer end, an inner end, a trailing edge region having a trailing edge, a leading edge region having a leading edge, the airfoil further including a suction sidewall and a pressure sidewall which are joined at the leading and the trailing edge leaving a cavity for cooling gas disposed therein, the airfoil further including a first wall spaced chordwise from the leading edge and extending between the sidewalls leaving a first passage extending spanwisely in the leading edge region which is not in flow communication with the exterior of the airfoil through the leading edge region prior to disposing blocking material in the leading edge region, the airfoil including a second internal wall extending chordwise to divide the first spanwise passage into a first spanwise region and a second spanwise region, the airfoil having a third internal wall spaced chordwise from the leading edge and extending between the sidewalls leaving a second passage extending spanwisely adjacent to the first passage which is in flow communication with the first passage through a plurality of impingement holes in the first wall, one of the holes in flow communication with the second region being closest to the second wall leaving a region R of restricted circulation above the hole when the airfoil is oriented to receive the blocking material, the first passage being in flow communication with the second passage through the impingement holes as blocking material is flowed into the airfoil, the second passage and thus the first passage being in flow communication with the exterior of the airfoil through a first opening at the outer end and a second opening at the inner end, comprising:

A. orienting the airfoil with respect to a source of blocking material such that blocking material may be flowed into the second passage;

B. flowing blocking material into the second passage in a first environment having a gas at a first pressure $P_1$ and a first temperature $T_1$ and thence into the first passage, the blocking material being disposed in at least one of said passages such that it traps gas in the passage which includes B1. forming a dam about one end of the airfoil about the first opening in the airfoil which extends for a height $H_1$ which is about three-eighths of an inch above the portion of the airfoil adjacent to the first opening, the step including applying aluminum tape to the sides of the airfoil to form the dam, B2. blocking the second opening at the second end of the airfoil with aluminum tape prior to flowing the blocking material into the first passage, B3. flowing blocking material into the opening and filling the dam to a second height $H_2$ above the opening which is less than $H_1$;

C. disposing the airfoil filled with the blocking material in a second environment having a gas at a partial vacuum at a second temperature $T_2$ and a second pressure $P_2$ which is less than about one-hundred and twenty-five Torr and which is less than the first pressure $P_1$ which includes C1. orienting the airfoil such that buoyant forces acting on at least one expanding gas bubble urge the expanding gas bubble in the first passage into the second passage and urge the gas bubble in the second passage toward the first opening;

D. disposing thereafter the airfoil filled with blocking material in a third environment having a gas at a third pressure $P_3$ which is greater than the second pressure $P_2$;

E. heating the airfoil filled with blocking material at the third pressure $P_3$ for a predetermined period of time to harden the blocking material;

F. drilling a hole through the leading edge region by impacting the surface of the airfoil in the leading edge region with energy from a laser beam;

wherein expanding bubbles passing through the second passage urge the blocking material to flow into the first passage through the impingement holes extending between the second passage and the first passage; wherein blocking material urged into the first passage forces gas from the first passage through the impingement holes into the second passage; and, wherein remaining voids in the blocking material resulting from trapped pockets of gas in the first passage not responding to buoyant forces at the filling pressure $P_1$ are reduced by first expanding the volume of gas in the pocket against the pressure $P_2$ until the expanded bubble of gas is in flow communication with the impingement hole adjacent to the chordwise second wall causing at least a portion of the gas bubble to escape from the region R of the first passage through the second passage; and, wherein the higher pressure $P_3$ acting on the blocking material compresses any bubbles remaining to reduce the size of voids in the hardened blocking material; and, wherein the blocking material absorbs energy from the laser beam at the drilling location and blocks the beam from damaging the interior of the airfoil.

23. In a method for drilling a cooling hole by a laser into the interior of a leading edge of an airfoil of the type which includes disposing a viscous blocking material in a leading edge passage of the airfoil through a plurality of impingement holes prior to drilling the holes, the improvement which comprises:

flowing blocking material into an adjacent passage and into the leading edge passage, trapping gas in the passages; and, displacing the blocking material by placing the airfoil in a partial vacuum to increase the volume of the gas escaping from the airfoil through the passages to force blocking material in the second passage into the leading edge region through the impingement holes.

* * * * *